United States Patent [19]

Poetsch et al.

[11] 3,787,611

[45] Jan. 22, 1974

[54] SYSTEM FOR CORRECTING COLOR TELEVISION SIGNALS

[75] Inventors: Dieter Poetsch; Heinz Hess, both of Darmstadt, Germany

[73] Assignee: Robert Bosch Fernsehanlagen GmbH, Darmstadt, Germany

[22] Filed: Aug. 31, 1972

[21] Appl. No.: 285,230

[30] Foreign Application Priority Data

Sept. 7, 1971 Germany .................. P 21 44 745.0

[52] U.S. Cl. .......................................... 178/5.4 AC

[51] Int. Cl. .......................................... H04n 9/12

[58] Field of Search .................. 178/5.4 HE, 5.4 AC

[56] References Cited

UNITED STATES PATENTS

| | | | |
|---|---|---|---|
| 3,649,746 | 3/1972 | Knaver et al. | 178/5.4 HE |
| 3,708,614 | 1/1973 | Nakabe et al. | 178/5.4 HE |
| 2,888,514 | 5/1959 | Pritchard | 178/5.4 HE |

*Primary Examiner*—Richard Murray
*Assistant Examiner*—Fay Konzem
*Attorney, Agent, or Firm*—Littlepage, Quaintance, Murphy & Dobyns

[57] ABSTRACT

A system for correcting complete color television signals, including luminance, color saturation and hue signals. A first channel delays the signal while a second channel derives the necessary corrections for the delayed first channel signal.

4 Claims, 2 Drawing Figures

SYSTEM FOR CORRECTING COLOR TELEVISION SIGNALS

BACKGROUND OF THE INVENTION

The invention relates to a system for correcting color television signals in which the contrast of the luminance signal, the color saturation, and the hue are corrected.

Two methods for correcting color television signals have become known. In one of these known methods, the three color value signals R,G and B are separately controlled, whereas in the second method a complete color television signal (FBAS) is corrected. For the use of the first method, devices are already available. Since this method, however, assumes three-channel transmission, it can for many purposes only be used at increased cost and with quality losses, by additional decoding and subsequent coding. This is so because, in the area of television studios, for instance in the reproduction of magnetic recordings or in control devices, only a so-called FBAS signal is available.

SUMMARY OF THE INVENTION

The present invention aims at indicating a system that operates according to the second method and in which all occurring errors can be compensated independently of each other.

The invention includes a first channel which merely delays color television signals, and a second channel, connected in parallel to the first, in which a correction signal is generated. The second channel consists of a contrast-correcting circuit, a dark-desaturation circuit, a total saturation regulator, and a circuit for correcting hue. The outputs of these circuits are transmitted to the inputs of a first addition circuit.

In the dark-desaturation circuit, a limiter, a modulator, an automatic volume-control amplifier and a phase inverter stage are connected in series. In this circuit, an input of the modulator is connected to the output of a second addition circuit. The luminance signal is transmitted to the input of the limiter, and inputs of the first and a third addition stage are connected to the output of the phase inverter stage.

An auxiliary color transmitter transmits the color television signal to the second and third addition circuit, to which also the output signal of the circuit for correcting hue is transmitted. A total saturation regulator is arranged between the output of the third addition circuit and one of the inputs of the first addition circuit.

DESCRIPTION OF THE PREFERRED EMBODIMENT

Figure 1:
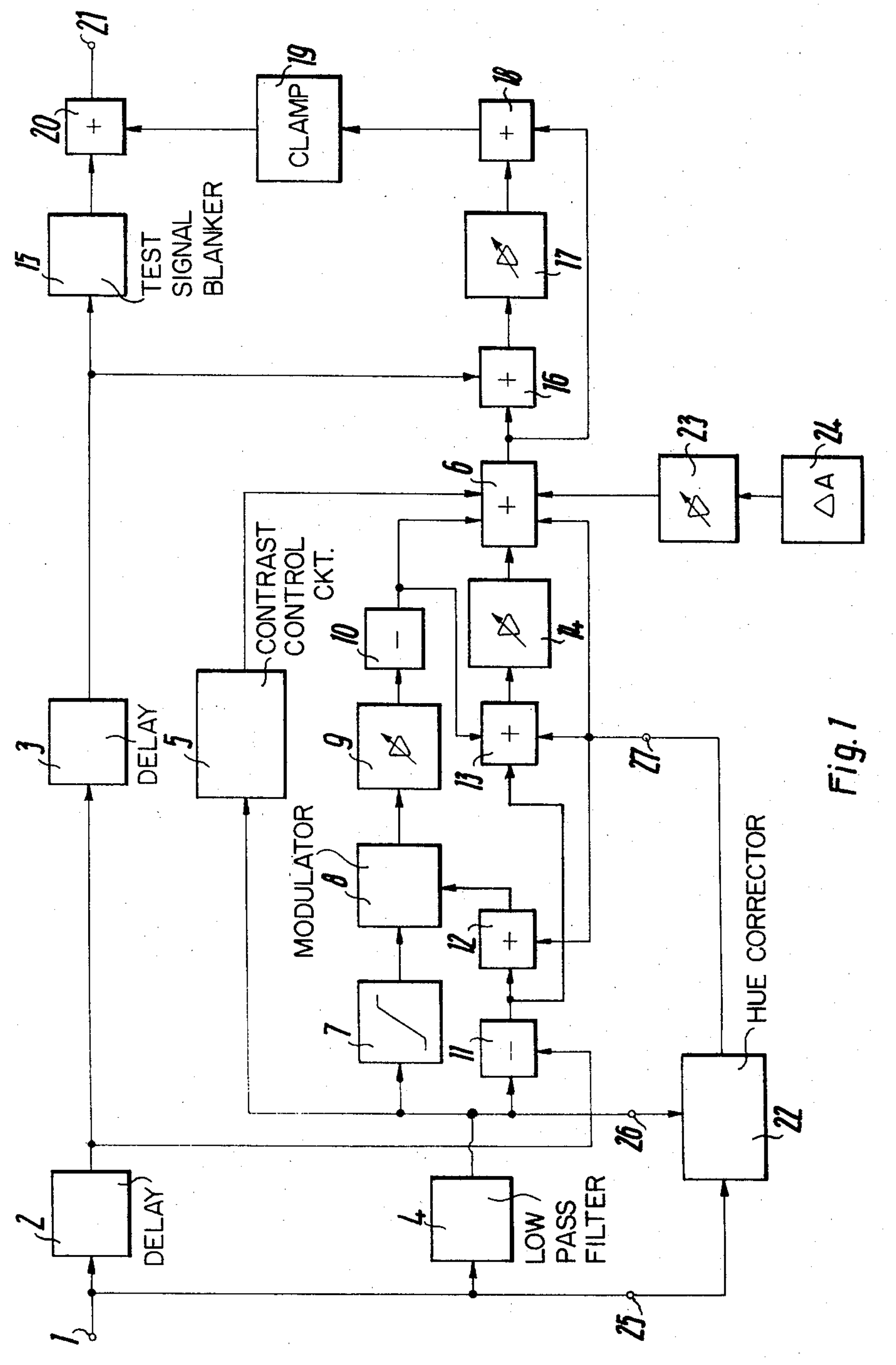
FIG. 1 is a block diagram of a system according to the invention.

In FIG. 1, color television signals are supplied to the system at a terminal 1. By means of a low-pass filter 4, the luminance portion is obtained. To compensate for the transit time of the low-pass filter 4, a delay device 2 is provided. Furthermore, another delay device 3 is provided in the first channel. Delay device 3 compensates for the transit time of the correcting devices described below. The color television signals pass through a circuit 15 for blanking out any test signals present. Outputs from circuit 15 pass through an addition circuit 20 to an output terminal 21 of the system.

To correct the contrast, the luminance signal from the output of low-pass filter 4 is passed through a contrast-regulating circuit 5, to an input of addition circuit 6. The contrast-regulating circuit 5 can be constructed in any known manner and is therefore not explained in detail.

To control color saturation, first the modulated chrominance carrier is obtained, by means of a subtraction circuit 11, from the color television signal delayed by delaying element 2 and from the luminance signal transmitted through low-pass filter 4. The luminance signal is also transmitted to a limiter 7 which transmits only those signals corresponding to the darker picture portions. The output signal of limiter 7 and the chrominance carrier are multiplied in a modulator 8. The product is transmitted, with an amplitude which is adjustable in an automatic-volume-control amplifier 9, by way of phase inverter stage 10, to respective inputs of addition circuits 6 and 13.

For adjustment of the total saturation correction, an adjustable amplifier 14 is provided whose output is connected to a further input of addition stage 6. The modulated chrominance carrier is transmitted from the output of subtraction circuit 11 through an addition circuit 12 and following elements to the input of adjustable amplifier 14.

To compensate for hue, a hue corrector circuit 22 is provided, to which are transmitted the color television signal through connecting point 25 and the luminance signal through connecting point 26. In circuit 22, a color vector is produced whose magnitude and phase relationship are separately adjustable for each of the three amplitude ranges of the luminance signal.

The output signal of circuit 22 is transmitted, by way of a connecting point 27, to an input of the addition circuit 13. Since, however, the amplitude and the phase relationship of the chrominance carrier oscillations supplied at point 27 are independent of the adjustment of amplifiers 9 and 14, errors in the adjustment of the saturation would result if no further measures were taken.

To avoid such errors, the output signal of circuit 22 is transmitted not only to addition circuit 6 but also to two further addition circuits 12 and 13. A result achieved by this measure is that the result of the hue correction is taken into account in the adjustment of the dark de-saturation as well as in the adjustment of the total saturation.

Furthermore, in order to make possible the adjustment of the total amplitude of the color television signals appearing at output 21 by means of a suitable control without interfering with the main channel constituted by devices 2,3,15, and 20, an adjustable amplifier 17 is provided. This amplifier receives the sum embodied in the correction signal appearing at the output of addition circuit 6 and the delayed color television signal. Besides, the correction signal is transmitted directly to one input of the addition circuit 18 and arrives thus finally at addition circuit 20, by means of which it is superimposed upon the color television signal. At the output of automatic-volume-control amplifier 17 appears a signal which is likewise composed of the color television signal and the correction signal, whose amplitude, however, is adjustable. This signal is also added, by addition circuits 18 and 20, to the color television signal. The automatic-volume-control amplifier 17 is arranged in such a way that its control range includes both polarities of the output signal, so that the amplitude of the output signals at point 21 can be made somewhat larger or somewhat smaller than the amplitude of the input signals at point 1.

For the adjustment of the black-level value of the correction signal, a blanking pulse is transmitted to a further input of the addition circuit 6 by way of pulse amplifier 24 and adjustable amplifier 23. Since the correction signal is clamped to the blanking pulse in a clamping circuit 19, an adjustment of the black-level value of the correction signal is carried out by means of an adjustable amplifier 23.

In an embodiment of the system described, devices 9, 14, 17, and 23 use amplifiers whose amplification factor can be adjusted by means of a control voltage, that is so-called adjustable amplifiers. However, without impairing the functioning of the system, potentiometers may also be employed. However, in comparison with adjustable amplifiers, potentiometers have the disadvantage that a remote control or a control of the system from a storage device is not readily possible.

Figure 2:
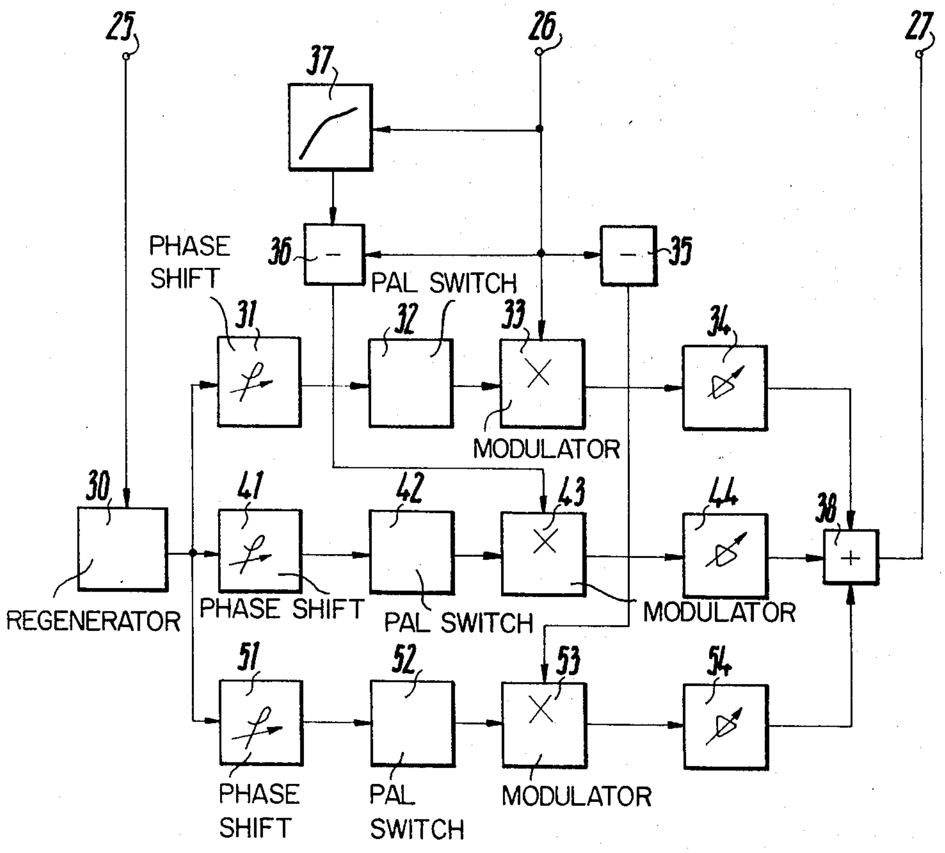
FIG. 2 is a block diagram of a correcting device for compensating hue.

FIG. 2 shows an embodiment of circuit 22. A chrominance carrier is obtained in a regenerator 30 from the color television signal supplied at point 25. This chrominance carrier is transmitted to three phase shifters, 31, 41, and 51, to each of which a respective PAL switch 32,42, and 52 is connected. In each of these channels thus formed a modulator is provided to which, in addition to the connected chrominance carrier, the luminance signal is transmitted. While the luminance signal is directly transmitted to modulator 33, the contrast of the luminance signal is deformed by means of inverter circuit 35, subtractor 36, and non-linear circuit 37 in such a way that the correction signals adjusted by means of phase shifters 31, 41, and 51 become respectively effective in the black area, the dark area and the white area. The intensity of the correction can be adjusted by means of regulators 34, 44, and 54. The output signals of the regulators are added in circuit addition 38 and transmitted to connecting point 27.

We claim:

1. A system for correcting color television signals, in which the contrast of the luminance signal, the color saturation, and the hue are corrected, comprising:

A. a first channel for delaying the color television signals;

B. a second channel connected in parallel with the first channel for forming a correction signal, comprising:

B1. a contrast correcting circuit,

B2. a dark-desaturation circuit,

B3. a total saturation circuit,

B4. a circuit for correcting hue, and

B5. a first addition circuit for receiving outputs from the contrast correcting circuit, the dark-desaturation circuit, the total saturation regulator, and the hue correcting circuit, C. the dark-desaturation circuit comprising:

C1. a limiter,

C2. a modulator fed by the limiter, and

C3. means with automatic-volume control responsive to an output of the limiter for producing an amplified, phase-inverted signal wherein the elements in the dark-desaturation circuit are connected in series, in which structure an input of the modulator is connected to the output of a second addition circuit, the luminance signal is transmitted to the input of the limiter, and inputs of the first and a third addition stage are connected to the output of the phase inverter stage;

D. wherein the auxiliary chrominance carrier is separated from the color television signal and is transmitted to the second and third addition circuit, to which also the output signal of the hue correction circuit is transmitted;

E. and wherein the total saturation regulator is arranged between the output of the third addition circuit and one of the inputs of the first addition circuit.

2. A system according to claim 1, wherein the circuit for correcting hue comprises:

A. a chrominance carrier regenerator

B. three essentially equal channels and

C. a fourth addition circuit connected to receive the outputs of the three equal channels, wherein each of the three channels comprises, in series connection, a phase shifter, a PAL switch, a modulator, and an automatic-volume-control amplifier and wherein luminance signals are transmitted to the inputs of the modulators in which structure a different amplitude range of the luminance signals is provided for each channel.

3. A system according to claim 1, wherein the delayed color television signals of the first channel and the output signal of the first addition circuit are added and transmitted to a further automatic volume control amplifier; and wherein the output signal of the further automatic volume control amplifier and the output signal of the first addition circuit are both added to the delayed color television signals.

4. A system according to claim 3, wherein, for the adjustment of the black-level value of the correction signals, a blanking pulse of adjustable amplitude and polarity is transmitted to a further input of the first addition circuit, and wherein, a clamping circuit is provided between an addition circuit, which follows the further automatic-volume-control amplifier and an addition circuit which adds the delayed television signals and the correction signals.

* * * * *